Feb. 18, 1941. W. T. BRENNAN 2,232,363
ELECTRIC MOTOR
Original Filed May 30, 1938
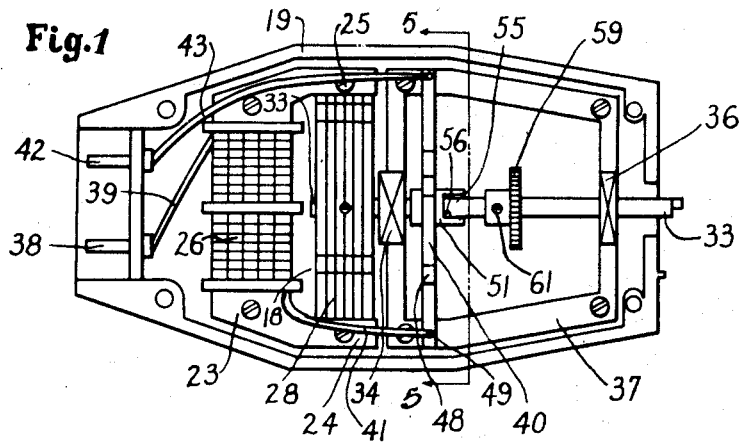
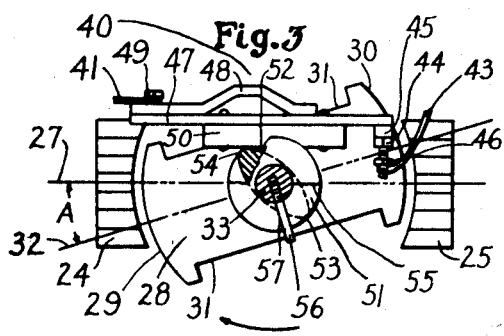
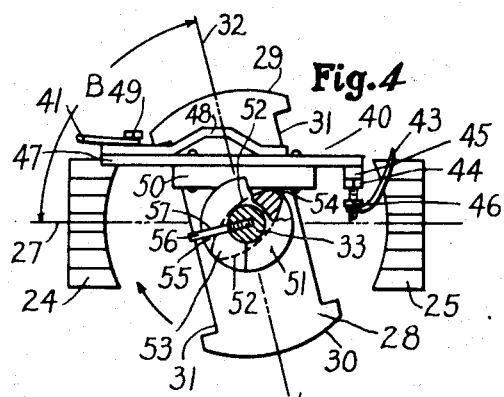
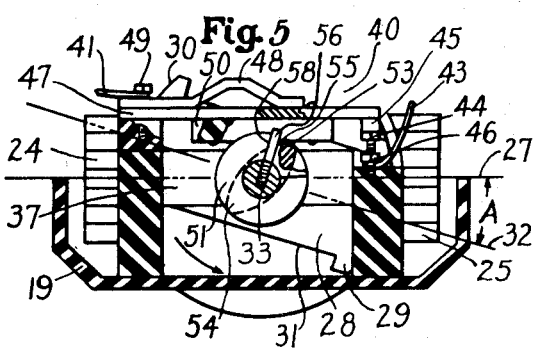
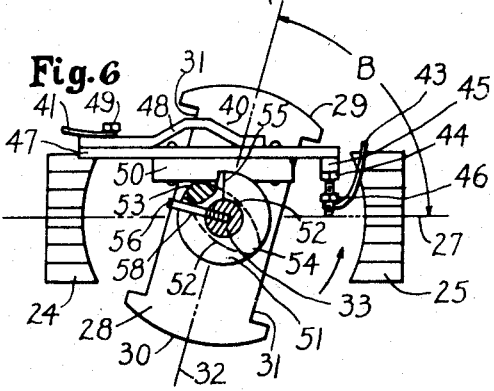
INVENTOR
WILLIAM T. BRENNAN
BY Ford C. Pethick
ATTORNEY Patented Feb. 18, 1941

2,232,363

UNITED STATES PATENT OFFICE 2,232,363

ELECTRIC MOTOR

William T. Brennan, Dunmore, Pa., assignor to Scranton Electric Toothbrush Corporation, Scranton, Pa.

Original application May 30, 1938, Serial No. 208,960. Divided and this application May 9, 1939, Serial No. 272,671

8 Claims. (Cl. 172—36)

This invention relates to an improved electric motor of the magnetic type which operates on a make-and-break principle. The motor is adapted for any use but is particularly adapted for use in small hand tools such as a rotary tooth brush and the like.

Motors operating on the make-and-break principle, such as used in dry-shavers, are light in weight but heretofore have generally rotated only in one direction. Motors of this type, heretofore generally used, are usually provided with a cam fixed on the motor shaft or part of the motor shaft. The cam is usually arranged to open the make-and-break points a short time before the center line of the rotor poles becomes colinear with the center line of the field poles and to maintain the points in this open position until the center line of the rotor poles has rotated a considerable distance beyond the point where it was colinear with the center line of the field poles, at which point the cam allows the make-and-break contacts to close. In a two-pole motor this operation normally occurs twice in every revolution, and a motor so built will rotate only in one direction. After once being given a start a motor so constructed will rotate in a direction from the point where the rotor is when the contacts are opened, through the arc during which the contacts are held open, to a point where the rotor is when the contacts are closed. The unidirectional feature of make-and-break type motors, which have heretofore been used has made them generally unsatisfactory for use with motor-driven rotary tooth brushes.

This invention contemplates the provision of a new light weight motor which operates on the make-and-break principle and which may be easily and efficiently reversed.

A further object of this invention is to provide a reversible motor of the magnetic attraction type operating on a make-and-break circuit, such as, for example, those employed in actuating the moving parts of rotary tooth brushes or dry-shaving implements.

A further object of this invention is to provide a swivelly mounted cam for use with motors of the magnetic attraction type operating on a make-and-break circuit.

The above and other objects of this invention will appear in more detail during the course of the following description.

This application is a division of a joint application filed by me and William P. Kennedy on May 30, 1938, Serial No. 208,960.

In accordance with this invention in one form thereof a motor of the magnetic attraction type is provided with cam surfaces which are turnably mounted with respect to the main motor shaft.

For a more complete understanding of this invention, references should be had to the accompanying drawing in which:

Figure 1 is a plan view of the motor installed in a small housing unit. The cover is not shown, thus this figure shows the internal mechanism, Figure 2 is a perspective view of parts of the motor's main shaft and some of the associated mechanisms, Figure 3 is a fragmentary cross-section through the motor during clockwise rotation of the main shaft, partly broken away to show a high cam surface at the instant it starts to open the contacts of the make-and-break device, Figure 4 is a fragmentary cross-section through the motor during clockwise rotation of the main shaft, partly broken away to show a high cam surface at the instant it allows the contacts of the make-and-break device to close, Figure 5 is a cross-section view on the line 5—5 of Figure 1, partly broken away to show a high cam surface at the instant it starts to open the contacts of the make-and-break device during counter-clockwise rotation, Figure 6 is a fragmentary cross-section through the motor during counter-clockwise rotation, broken away to show a high cam surface at the point where it allows the make-and-break device to close, Referring to the drawing, this invention has been shown in one form as applied to a small motor unit adapted for use in small hand tools such as a rotary tooth brush and the like. This unit comprises small high speed motor 18 housed in a handle member 19 preferably of "Bakelite" or the like. For convenience in describing the device the portion farthest to the left in Figure 1 will be referred to as "back," while the portion to the right will be referred to as "front."

The motor comprises a field magnet 23 which is made with an open end providing opposite poles 24 and 25. The field magnet which is preferably made of laminated sheets riveted together, is approximately U-shaped and the cross-arm or reach is provided with the coil 26. The center line of field poles is shown at 27.

The rotor 28 is not wound and is arranged within the field magnet and positioned between the ends or field poles 24 and 25. The rotor is made of laminated sheets riveted together and has two opposite convex ends or poles 29 and 30, the opposite sides 31 of the rotor between the poles being cut away in a manner well-known to the art. The center line through rotor poles is shown at 32. The rotor 28 preferably revolves in a plane perpendicular to the plane of the field magnet and is supported on main shaft 33 and is securely fastened preferably by means of a set screw to main shaft 33 which is rotatably supported at the back in a bearing 34. At the front end, shaft 33 is rotatable in and supported by bearing 36. The bearings 34 and 36 are rigidly supported by the non-metallic frame 37 which is rigidly supported in handle 19.

One terminal 38 mounted in insulated handle 19 is electrically connected to one side of coil 26 by conductor 39. The other side of the coil is connected to the make-and-break device 40 by means of conductor 41. The other side of the make-and-break device is connected to the remaining terminal 42 by means of conductor 43. Terminal 42 is also mounted on insulated handle 19. The make-and-break device 40, for turning on and shutting off the current in coil 26 and thus the magnetic flux in field magnet 23, consists of two contact points 44 and 45. Point 44 is stationary and is semi-rigidly mounted on insulated frame 37, being adjustable only by the movement of bolt 46 or by some other suitable means. Point 45 is movable, since it is mounted on one end of flexible arm 47. The other end of flexible arm 47 is rigidly fastened to frame 37 as described below. Disposed above and in contact with flexible arm 47 is leaf-spring 48. Leaf-spring 48 supplies pressure to flexible arm 47 in such a manner as normally to hold movable point 45 in contact with stationary point 44. Leaf-spring 48 and flexible arm 47 are clamped together and fastened to the frame 37 by bolt 49. Disposed below and riveted to flexible arm 47 is an insulating member which acts as cam follower 50.

Swivel 51, preferably in the form of a cylindrical collar, is loosely mounted coaxially on main shaft 33 and is longitudinally positioned in front of bearing 34. The portion of swivel 51 disposed below make-and-break device 40 acts as a cam and has opposite sides cut away to provide voids which act as low surfaces 52, leaving the uncutaway portions to act as high surfaces 53 and 54 of the cam. It should be noted that I have chosen to show two high cam surfaces 53 and 54 for use with my bi-polar motor. These high cam surfaces are spaced 180° apart on opposite sides of the swivel 51. The edges of these high cam surfaces are rounded off to insure that they operate smoothly when they engage cam follower 50. It should also be noted that low cam surface 52 and the high cam surfaces 53 and 54 combine to form an approximately elliptical shaped cam. The main shaft 33, swivel 51, and make-and-break device 40 are positioned in spaced relationship one with the other so that the following will be accomplished: first, when either one of the voids 52 is beneath insulating cam follower 50, spring 48 will cause points 44 and 45 to make contact and thus completes the electric circuit through coil 26. Second, when either of the cam's high surfaces 53 or 54 are rotated so as to approach the point where they will be directly under the cam follower 50, the high cam surface will make contact with cam follower 50 and will start to open the contact points 44—45. Third, when the above mentioned high cam surface has once opened the points 44—45, the high cam surface will maintain the points 44—45 in the open position until the high cam surface has passed well beyond the point where the high cam surface was directly under the cam follower 50. In other words, swivel 51 provides the necessary cam action required to raise and lower flexible arm 47 and thus opens and closes contacts 44—45.

The front end of swivel 51 is provided with notch 55, preferably in the form of a sector cut out of the cylindrical walls of the swivel. Pin 56 extends radially from shaft 33 and is preferably fastened to shaft 33 by screw threaded engagement. Pin 56 is positioned within notch 55 and is the sole restraining member which keeps swivel 51 from rotating freely on shaft 33. It should be noted in Figure 4 that pin 56 cannot move out of notch 55 in a direction longitudinal with the shaft. The rotor 28 is fixed to the shaft 33 directly in back of bearing 34 and the swivel 51 is located directly in front of bearing 34, the pin 56 being fastened to shaft 33 in notch 55 so as to maintain this relationship.

It has been desirable to provide swivel 51 which acts as an automatically adjustable cam. If the shaft 33 is rotated in the clockwise direction as viewed from the front, then shaft 33 causes pin 56 to take a position in notch 55 as at 57, and swivel 51 follows shaft 33 in its clockwise rotation as viewed from the front. If the shaft 33 is rotated in a counter-clockwise direction as viewed from the front, the movement of the shaft causes pin 56 to take a position in the notch 55 as at 58 and swivel 51 follows shaft 33 in its counter-clockwise rotation. This movement of swivel 51 on shaft 33 causes the cam's high surfaces 53 and 54 to assume with respect to the center line of the rotor poles 32 a different position for clockwise than for counter-clockwise rotation of shaft 33. It is desirable to speak of swivel 51 as being swivelly mounted on shaft 33, or swivel 51 as shown in this preferred embodiment might be termed a collar means turnably mounted for a limited lost motion on shaft 33. It should be noted that since the rotor 28 and pin 56 are both rigidly fastened to shaft 33, the rotor 28 has a fixed relationship with respect to pin 56. Also the cam's high surfaces 53 and 54, as well as notch 55 are both parts of the same swivel 51, and thus high surfaces 53 and 54 have a fixed relationship with respect to notch 55.

I have chosen to show pin 56 as having its axis perpendicular to the center line of the rotor poles 32. I have also chosen to show the high cam surface 53 as being positioned so that the center line of cam surface will bisect the sectoral segment or notch 55. I have chosen to show sectoral notch 55 as having a central angle of approximately 90° although this angle may be varied considerably depending on the diameter of pin 56 and other dimensions.

I have chosen to show starting wheel 59 positioned directly in front of swivel 51. This wheel is coaxially mounted on main shaft 33 and is fixed thereto by means of set screw 61. When the cover (not shown) is in place the starting wheel 59 projects through a slot (not shown) in the cover (not shown) so that enough of the wheel projects to allow it to be started in either direction by a sweep of the finger, and to be stopped by pressure of the finger. The wheel 59 is the means provided for starting or stopping the motor and is the only means provided for reversing the direction of rotation of the motor.

In the operation of this apparatus, if it is desirable to operate the motor the terminals 38 and 42 are connected by a suitable extension cord (not shown) to a suitable source of electric power supply. The finger is passed over starting wheel 59 in either direction depending on which way it is desirable to have the motor rotate. If the starting wheel 59 is turned in a clockwise direction as viewed from the front end, starting wheel 59 will rotate shaft 33 in a clockwise direction. This will cause pin 56 to assume a position in notch 55 as shown at 57 (see Figures 3 and 4). Pin 56 then causes swivel 51 to turn in a clockwise direction which in turn causes high cam surfaces 53 and 54 to rotate in a clockwise direction. When one of the high cam surfaces engages cam follower 50 (see Figure 3), flexible arm 47 is caused to lift against the pressure of springs 48. The lifting of arm 47 opens contacts 44—45. As the swivel is rotated, the high cam surface finally passes beyond cam follower 50 (see Figure 4) and allows cam follower 50, flexible arm 47, and spring 48 to assume their normal positions, thus closing contacts 44—45. The closing of contacts 44—45 causes coil 26 to be energized which in turn causes the rotor 29 and shaft 33 to be rotated in a manner well-known to the art.

If it is desirable to stop the motor 18, the finger is pressed heavily onto wheel 59 until the motor stops or the electrical service connection may be opened and held open.

If it is desirable to rotate the motor 18 in the counter-clockwise direction (see Figures 5 and 6), the starting wheel 59 is turned in the counter-clockwise direction and the starting wheel 59 will rotate shaft 33 in a counter-clockwise direction. This will cause pin 56 to assume a position in notch 55 as shown at 58. Pin 56 then causes swivel 51 to rotate in the counter-clockwise direction, which in turn causes high cam surfaces 53 and 54 to rotate in a counter-clockwise direction. When one of the high cam surfaces engages cam follower 50 (see Figure 5), the contacts 44—45 are opened and later the cam surfaces allow points 44—45 to close (see Figure 6), in a manner similiar to that previously described for clockwise rotation. The motor now rotates counter-clockwise.

It should be noted that regardless of which direction shaft 33 is turned, the high cam surfaces 53—54 open contacts 44—45 just before the center line of rotor poles 32 becomes colinear with the center line of field poles 27 as shown by angle "A" (see Figures 3 and 5). It should also be noted that regardless of the direction of rotation of shaft 33, the uncutaway cam surfaces 53 or 54 maintain the contacts 44—45 in the open position until the center line of rotor poles 32 has passed well beyond the point where it was colinear with the center line of field poles 27 as shown by angle "B" (see Figures 4 and 6). This operation is accomplished by pin 56 shifting from position 57 to position 58 or vice versa in notch 55, depending on the direction of rotation of shaft 33. Another way of expressing this same idea is to say that the high cam surfaces 53 and 54 assume a different relative position with respect to the center line through rotor poles 32 for clockwise rotation than for counter-clockwise rotation because swivel 51 is swivelly mounted on shaft 33.

It has been found that a motor constructed in accordance with this invention will operate satisfactorily in either direction when connected to either direct-current or alternating-current circuits, and that if the motor is connected to a proper power source and started in a clockwise direction, it will satisfactorily operate in that direction until stopped, and that if the motor is connected to a proper power source and started in a counter-clockwise direction, it will satisfactorily operate in that direction until stopped.

It is to be understood that the form of the invention, herewith shown and described, is to be taken as a preferred example of the invention, and that various changes in the shape, size, arrangement of parts, and other details may be resorted to, without departing from the spirit of this invention or the scope of the subjoined claims.

What I claim as new and desire to secure by Letters Patent of the United States is:

1. A reversible electric motor of the magnetic attraction type having as its reversing mechanism a make-and-break device, a collar means mounted on the shaft of said motor, means on said collar means for operating said make-and-break device, and a means for limiting the motion of said collar means with respect to said shaft.

2. A reversible electric motor comprising field poles, coil means for magnetizing said field poles, a main shaft, rotor poles fixed to said shaft and rotatably positioned between said field poles, a make-and-break device for alternately energizing and deenergizing said coil means, and cam surfaces for opening and closing said make-and-break device, said cam surfaces being mounted for a limited lost motion with respect to said rotor poles.

3. An electric motor of the magnetic attraction type having as its reversing mechanism a make-and-break device, a shaft, a collar means turnable with respect to said shaft, means on said collar means for operating said make-and-break device, and a means for limiting the motion of said collar means with respect to said shaft.

4. A reversible electric motor of the magnetic attraction type having as its reversing means a device comprising a make-and-break means, a shaft, and a cam mechanism mounted for a limited lost motion with respect to said shaft, said cam mechanism being arranged to operate said make-and-break means.

5. A reversible electric motor of the magnetic attraction type operating on a make-and-break circuit comprising field poles, coil means for magnetizing said field poles, a main shaft, rotor poles fixed to said main shaft and rotatably positioned between said field poles, a make-and-break device for alternately energizing and deenergizing said coil means, a notched collar loosely mounted on said main shaft, high and low cam surfaces on said collar, and a pin fastened to and projecting radially from said main shaft, said pin and said notched collar cooperating to provide limited lost motion for said cam surfaces.

6. A reversible mechanism for use with multipolar motors of the make-and-break type comprising a shaft, a notched swivel loosely mounted on said shaft, high and low cam surfaces on said swivel the number of said high and the number of said low cam surfaces being equal to the number of poles in said multi-polar motor, and a pin fastened to and projecting radially from said shaft, said pin and said notched swivel cooperating to provide limited lost motion for said cam surfaces whereby said cam surfaces assume a different position with respect to said shaft for clockwise rotation of said shaft than is assumed by said cam surfaces during counter-clockwise rotation of said shaft.

7. A reversible electric motor of the magnetic attraction type operating on a make-and-break circuit comprising a set of two field poles, coil means for magnetizing said field poles, a main shaft, a set of two rotor poles fixed to said main shaft and rotatably positioned between said field poles, a make-and-break device for alternately energizing and deenergizing said coil means, a notched collar loosely mounted on said main shaft, a set of two high and a set of two low cam surfaces on said collar, said high cam surfaces being spaced 180° apart and said low cam surfaces also being spaced 180° apart, and a pin fastened to and projecting radially from said main shaft, said pin and said notched collar co-operating to provide limited lost motion for said cam surfaces.

8. A reversible electric motor comprising field poles, coil means for magnetizing said field poles, a main shaft, rotor poles fixed to said shaft and rotatably positioned between said field poles, a make-and-break device for alternately energizing and deenergizing said coil means, and cam surfaces for opening and closing said make-and-break device, said cam surfaces being mounted for a limited lost motion with respect to said rotor poles, whereby said cam surfaces assume a different position with respect to said rotor poles for clockwise rotation of said shaft than is assumed by said cam surfaces during counter-clockwise rotation of said shaft.

WILLIAM T. BRENNAN.